(12) United States Patent
Foster et al.

(10) Patent No.: US 10,973,163 B2
(45) Date of Patent: Apr. 13, 2021

(54) MISSION CONTROL SYSTEM AND METHOD FOR AN AGRICULTURAL SYSTEM

(71) Applicants: CNH Industrial America LLC, New Holland, PA (US); Autonomous Solutions, Inc., Mendon, UT (US)

(72) Inventors: Christopher A. Foster, Mohnton, PA (US); John H. Posselius, Ephrata, PA (US); Paul J. Lewis, Hyrum, UT (US); Bret Todd Turpin, Wellsville, UT (US); Jeremy Alexander Harris, Preston, ID (US); James Brian Stewart, Richmond, UT (US); Max J. Barfuss, Logan, UT (US); Joshua Hill Henrie, Hyrum, UT (US); Daniel John Morwood, Petersboro, UT (US); Brandon Chamberlain Adams, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 404 days.

(21) Appl. No.: 14/709,235

(22) Filed: May 11, 2015

(65) Prior Publication Data

US 2015/0319913 A1 Nov. 12, 2015

Related U.S. Application Data

(60) Provisional application No. 61/991,563, filed on May 11, 2014.

(51) Int. Cl.
*A01B 69/00* (2006.01)
*G05D 1/02* (2020.01)
*A01B 79/00* (2006.01)

(52) U.S. Cl.
CPC .............. *A01B 69/00* (2013.01); *G05D 1/021* (2013.01); *G05D 1/0217* (2013.01); *A01B 79/005* (2013.01); *G05D 2201/0201* (2013.01)

(58) Field of Classification Search
CPC ....... A01B 69/00; A01B 79/00; A01B 79/005; A01B 69/008; G05D 1/0217; G05D 1/021; G05D 2201/0201
See application file for complete search history.

(56) References Cited

U.S. PATENT DOCUMENTS

| | | | |
|---|---|---|---|
| 2009/0118904 A1* | 5/2009 | Birnie | G01C 21/00 701/41 |
| 2009/0228166 A1* | 9/2009 | Durkos | G05D 1/0246 701/26 |

(Continued)

*Primary Examiner* — Kelly D Williams
(74) *Attorney, Agent, or Firm* — Rebecca L. Henkel; Rickard K. DeMille

(57) ABSTRACT

A system includes an electronic control system for an agricultural system, including a controller configured to receive a first signal indicative of a mission of a work vehicle of the agricultural system. The controller is configured to determine a first desired path of travel of the work vehicle based on the mission. The controller is configured to output a second signal to the work vehicle indicative of the first desired path of travel, to receive a third signal indicative of a change event from the work vehicle or from an operator, to determine a response to the change event that facilitates completion of the mission, and to output a fourth signal indicative of the response to the work vehicle.

3 Claims, 5 Drawing Sheets

(56) References Cited

U.S. PATENT DOCUMENTS

| | | | |
|---|---|---|---|
| 2010/0094481 A1* | 4/2010 | Anderson | G05D 1/0088 701/1 |
| 2010/0094499 A1* | 4/2010 | Anderson | G05D 1/0295 701/23 |
| 2011/0084851 A1* | 4/2011 | Peterson | A01B 69/008 340/902 |
| 2011/0196565 A1* | 8/2011 | Collins | A01B 69/007 701/26 |
| 2014/0303814 A1* | 10/2014 | Burema | A01B 79/005 701/3 |

* cited by examiner

US 10,973,163 B2

MISSION CONTROL SYSTEM AND METHOD FOR AN AGRICULTURAL SYSTEM

BACKGROUND

The invention relates generally to agricultural systems and, more particularly, to a control system for autonomous vehicle within an agricultural system.

Generally, autonomous vehicles follow a specified path, which is predetermined by an automated system (e.g., with input from an operator), to conduct tillage, fertilizing, planting, spraying, harvesting, mowing, baling, and/or planting operations. For example, the operator may specify a desired mission, and the automated system may establish a path through an agricultural field, e.g., using a GPS system to guide the vehicle through the agricultural field. However, it may be difficult to restart tillage, fertilizing, and/or planting operations if a stoppage occurs. For example, a sprayer may run low on liquid fertilizer and leave the field to refill storage tanks. When the sprayer returns to the field, it may be difficult to accurately realign with vehicle with the previous stopping point. As a result, product may be wasted as portions of the field are refertilized, or fertilizer may not be properly delivered to portions of the field.

BRIEF DESCRIPTION

In one embodiment, an electronic control system for an agricultural system, includes a controller configured to receive a first signal indicative of a mission of a work vehicle of the agricultural system. The controller is configured to determine a first desired path of travel of the work vehicle based on the mission. In some embodiments, the controller is configured to output a second signal to the work vehicle indicative of the first desired path of travel, to receive a third signal indicative of a change event from the work vehicle or from an operator, to determine a response to the change event that facilitates completion of the mission, and to output a fourth signal indicative of the response to the work vehicle.

In another embodiment, an electronic control system for an agricultural system includes a controller. The controller includes a memory operatively coupled to a processor. The processor is configured to store data and instructions that, when executed by the processor, cause the controller to perform a method. The method includes receiving a first signal indicative of a mission of a controllable device of the agricultural system. The method also includes determining a first desired path of travel of the controllable device based on the mission. The method includes outputting a second signal to the controllable device indicative of the first desired path of travel. In some embodiments, the controllable device is configured to adjust a target path of travel based on the first desired path of travel. The method also includes receiving a third signal indicative of a change event from the controllable device or from an operator. Furthermore, the method includes determining a response to the change event that facilitates completion of the mission. The method also includes outputting a fourth signal indicative of the response to the controllable device, wherein the controllable device is configured to adjust the target path of travel based on the response to the change event.

In a further embodiment, a method of monitoring and controlling an agricultural system includes receiving a first signal indicative of a mission of a controllable device of the agricultural system. The method further includes determining a first desired path of travel of the controllable device based on the mission. The method also includes outputting a second signal to the controllable device indicative of the first desired path of travel. In some embodiments, the controllable device is configured to adjust a target path of travel based on the first desired path of travel. The method includes receiving a third signal indicative of a change event from the controllable device or from an operator. The method also includes determining a response to the change event that facilitates completion of the mission. The method further includes outputting a fourth signal indicative of the response to the controllable device, wherein the controllable device is configured to adjust the target path of travel based on the response to the change event.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a control system for monitoring and controlling an autonomous or semi-autonomous agricultural vehicle. The control system is configured to direct the vehicle along a path of travel to complete a mission in an agricultural field. Moreover, the control system is configured to direct the vehicle to automatically resume the mission after an interruption. For example, the control system may receive an indication that the vehicle is running low on fuel. Accordingly, an operator may direct the vehicle to a refueling location, and then subsequently instruct the vehicle to resume the previous mission. As a result, the control system may direct the vehicle to return to the position at which it disengaged from the mission, thereby enabling the vehicle to resume the mission. In certain embodiments, the control system may optimize the path of travel of the vehicle based on the interruption. For example, after the interruption, the control system may direct the vehicle along a new path of travel (e.g., starting from an edge of the field proximate to the refueling location) to enable the vehicle to complete the mission, thereby reducing the duration of the mission.

Figure 1:
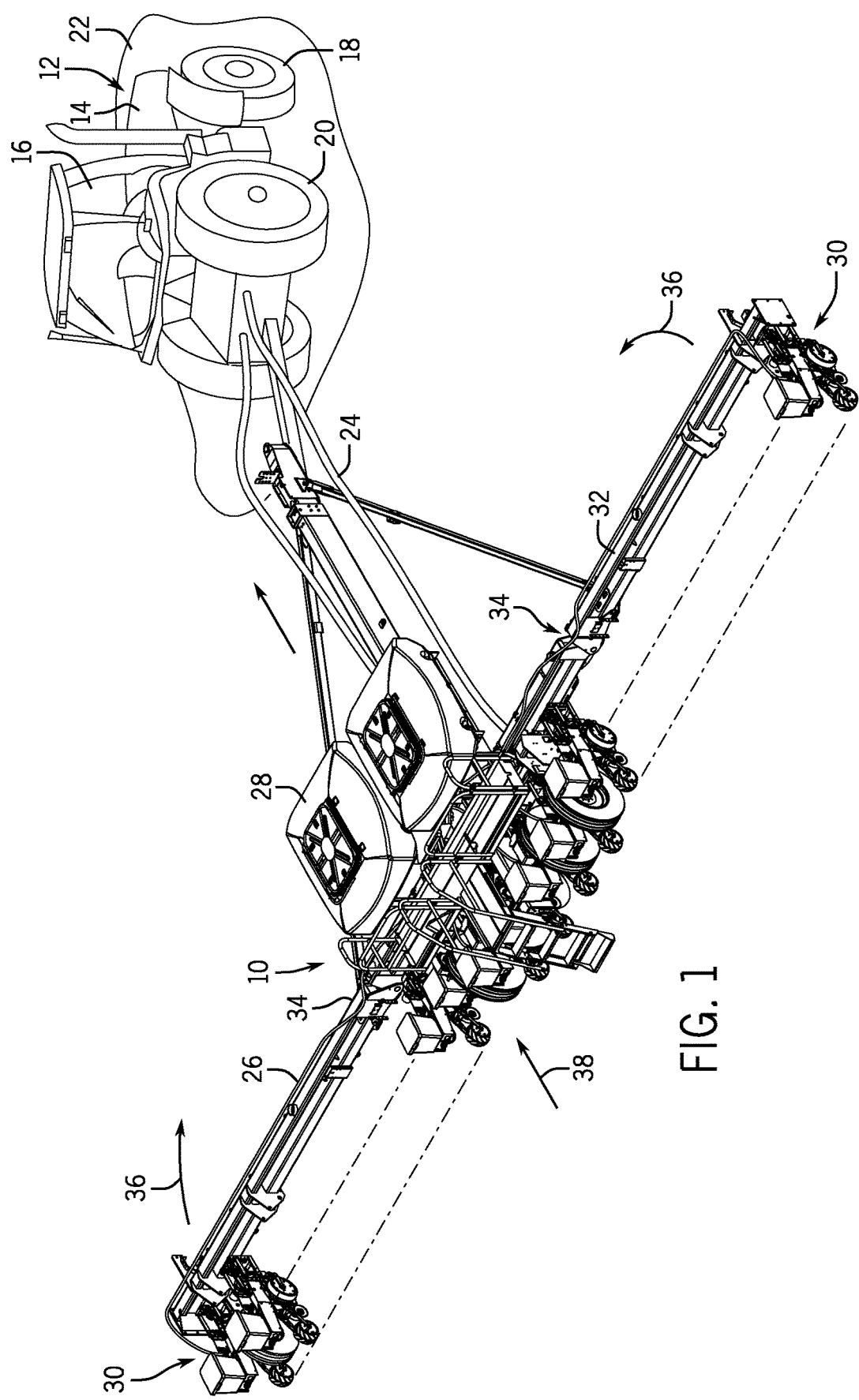
FIG. 1 is a perspective view of an embodiment of an agricultural implement and a work vehicle, which may be controlled by an automated control system.

Turning now to the drawings, FIG. 1 is a perspective view of an embodiment of an agricultural implement 10 (e.g., controllable device) and a work vehicle 12 (e.g., controllable device). As used herein, a controllable device is a device configured to receive operating instructions from a control system. For instance, the work vehicle 12 may receive operating instructions from an automatic control system. The illustrated work vehicle 12 has a body 14 that houses an engine, transmission (e.g., gear box), cooling system, and power train. The work vehicle 12 has a cabin 16 where an operator may sit or stand to operate the vehicle 12. The work vehicle 12 has two front wheels 18 and two rear wheels 20 that rotate to move the work vehicle 12 along the ground 22 at a ground speed. In some embodiments, the work vehicle 12 may have tracks rather than one or both sets of wheels 18, 20.

The agricultural implement 10 is towed behind the work vehicle 12 across the ground 22, as shown in FIG. 1. However, in certain embodiments, the agricultural implement 10 may be a self-contained self-propelled machine (e.g., a self-propelled sprayer, a combine harvester, a forage harvester, etc.). While the illustrated embodiment includes a planter, it should be appreciated that the agricultural implement 10 may be a field cultivator, sprayer, or any other type of agricultural implement towed behind the work vehicle 12. The work vehicle 12 supplies a working fluid (e.g., hydraulic fluid) to the agricultural implement via one or more fluid lines 24. One or more actuators (e.g., hydraulic motors, hydraulic cylinders, etc.) receive the working fluid from the work vehicle 12 and drive systems of the agricultural implement 10. For example, one or more hydraulic motors may drive a fan and/or seed drive to direct agricultural material (e.g., seeds, fertilizer, etc.) along supply lines 26 from tanks 28 to multiple row units 30 distributed along a frame assembly 32. Each row unit 30 may be configured to deposit seeds at a desired depth beneath the soil surface, thereby establishing rows of planted seeds.

The agricultural implement 10 may have a variety of systems driven by the working fluid (e.g., hydraulic fluid) supplied by the work vehicle 12. For example, motors of the agricultural implement may be driven by the working fluid to facilitate delivery of the agricultural product and/or may establish a vacuum pressure within the tanks 28 or supply lines. In some embodiments, the frame assembly 32 of the agricultural implement 10 may be adjustable to fold into a transport configuration (e.g., via rotation of wings about joints 34) as shown by arrows 36 and/or to pivot and align the frame assembly 32 with a direction of travel 38.

Figure 2:
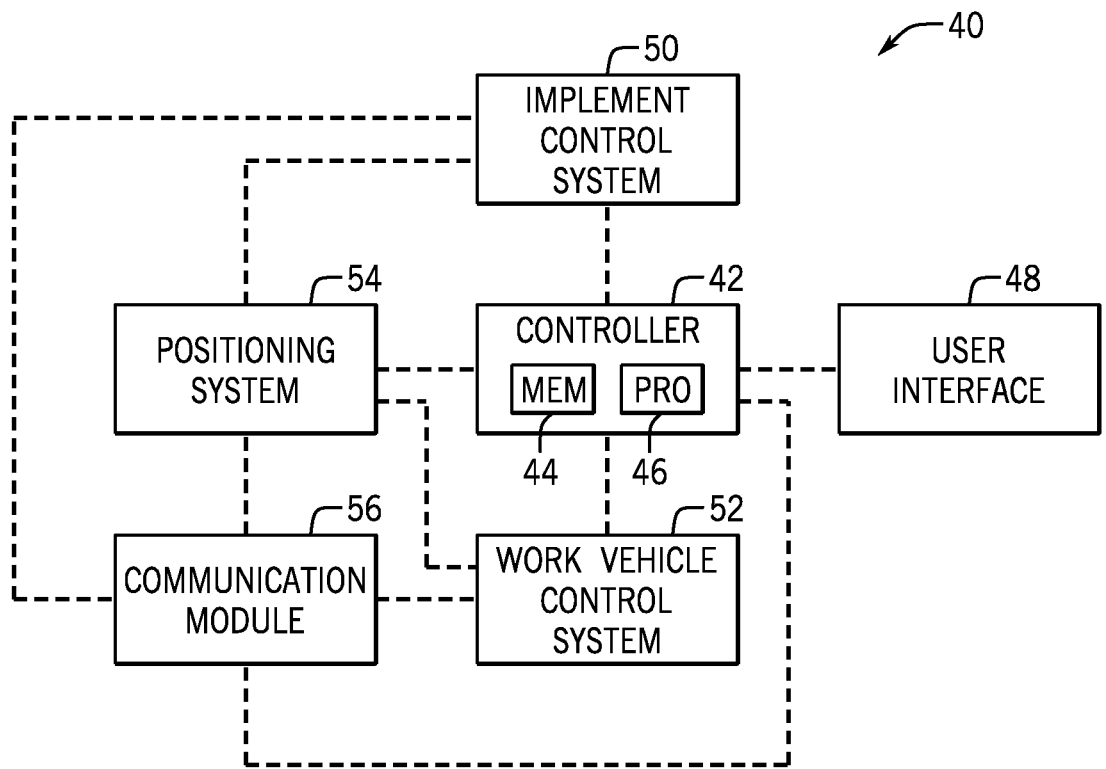
FIG. 2 is a block diagram of an embodiment of a control system for controlling the work vehicle and the agricultural implement.

FIG. 2 is a block diagram of an embodiment of a control system 40 for controlling the work vehicle 12 and the attached agricultural implement 10. As shown, the control system 40 contains several sub-control systems configured to control individual components of the work vehicle 12 and the agricultural implement 10. In the illustrated embodiment, the control system 40 includes a controller 42 having a memory 44 and a processor 46, and a user interface 48. The memory 44 may be any type of non-transitory machine readable medium for storing data and executable instructions, such as random-access memory, read-only memory, rewritable flash memory, hard drives, optical discs, and the like. The processor 46 may execute instructions stored on the memory 44. For example, the memory 44 may contain machine readable code, such as instructions, that may be executed by the processor 46. In some embodiments, the memory 44 and processor 46 may enable automatic (e.g., processor/memory controlled) operation of the agricultural implement 10 and/or the work vehicle 12. In other words, the control system 40 may include an automatic control system configured to provide instructions to the controller 42.

As will be described in detail below, the user interface 48 is configured to display real-time or near real-time information (e.g., work vehicle position, fertilizer levels, etc.) to the operator in the cabin 16 or to an operator in a central control station (e.g., remote from the work vehicle 12). Moreover, the user interface 48 may enable an operator to input commands to the controller 42 to control operation of the agricultural implement 10 and/or the work vehicle 12. For example, the operator may pause and/or resume a mission conducted by the work vehicle 12. Furthermore, in certain embodiments, the user interface 48 is a "touch screen" or interactive type of display (e.g., liquid crystal display, light emitting diode display, etc.) that is configured to receive inputs from the operator. For example, in some embodiments, the user interface 48 is a capacitive touch screen with haptic feedback. However, other types of technology may be used to receive operator input, including infrared, resistive, and the like. As mentioned above, the user interface 48 may be integrated into the cabin, the central control station, or both.

In the illustrated embodiment, several sub-control systems are communicatively coupled to the controller 42. For instance, an implement control system 50 is configured to monitor and control features of the agricultural implement 10. For example, the implement control system 50 may include a controller and valves configured to regulate hydraulic fluid pressure within actuators of the agricultural implement. Moreover, the implement control system 50 may include sensors to monitor fertilizer levels, seed levels, and the like. The control system 40 also includes a work vehicle control system 52. The work vehicle control system 52 is configured to regulate and monitor systems of the work vehicle 12. For example, the work vehicle control system 52 may include sensors to monitor engine speed, fuel levels, and the like.

As mentioned above, the work vehicle 12 is an autonomous and/or semi-autonomous vehicle in the illustrated embodiment. Accordingly, the work vehicle 12 is configured to guide itself throughout an agricultural field via programmed controls. For example, in the illustrated embodiment, the control system 40 includes a positioning system 54 configured to guide the work vehicle 12 along a desired path. The positioning system 54 may include a receiver and/or an inertial measurement system (e.g., a global positioning system utilizing orbiting satellites combined with a dead reckoning algorithm) configured to determine a measured position, and a guidance system configured to guide the vehicle 12 based on the measured position. For example, the positioning system 54 may guide the work vehicle 12 to an end of the agricultural field, direct the work vehicle 12 to turn around at a headland, and direct the work vehicle 12 to a second end of the agricultural field along the path of travel. In the illustrated embodiment, as described in detail below, a path of travel is preloaded into the memory 44 of the controller 42 such that the positioning system 54 guides the work vehicle 12 through the agricultural field. For example, GPS coordinates may be stored in the memory 44 and relayed to the positioning system 54 via the controller 42.

In the illustrated embodiment, the control system 40 includes a communication module 56. The communication module 56 is configured to send and receive data to/from the control system 40. For example, the communication module 56 may have a wireless transceiver (e.g., cellular, 4G, IEEE 802.11, RF, etc.) configured to send and receive information between the control system 40 and a work vehicle 12 and/or the central control station. As will be described in detail below, the communication module 56 enables updated instructions to be sent to a work vehicle 12 and/or communication between multiple work vehicles 12 in the same field. In some embodiments, the control system 40 is part of the central control station or part of a distributed network between work vehicles 12. In certain embodiments, the communication module 56 is integrated into the work vehicle 12.

As described above, the control system 40 enables autonomous control of the work vehicle 12 and/or the agricultural implement 10. For instance, the controller 42 may send instructions (e.g., from an operator at the central control station) to the positioning system 54 to guide the work vehicle 10 through the agricultural field. Moreover, the controller 42 may communicate with the implement control system 50 and the work vehicle control system 52 to gather information related to seed levels, fertilizer levels, fuel levels, and the like to facilitate planning of refueling and refilling procedures. Furthermore, the communication module 56 of the control system 40 enables the controller 42 to receive updated instructions while the work vehicle 12 is in the field. As a result, the work vehicle 12 may suspend or change operations in response to additional considerations such as weather, fuel levels, and equipment availability.

Figure 3:
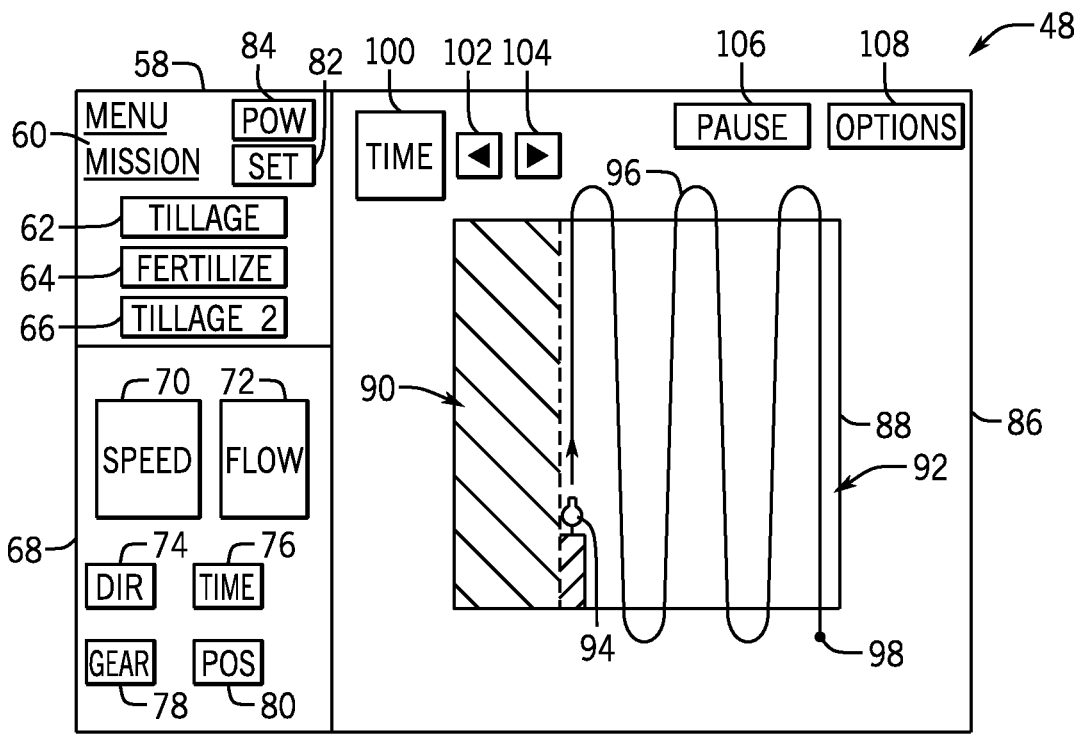
FIG. 3 is a schematic drawing of an embodiment of a user interface configured to facilitate monitoring and controlling an automated control system.

FIG. 3 is a schematic drawing of an embodiment of the user interface 48, which is configured to communicate with the controller 42. As described above, the user interface 48 may be positioned in the cabin 16 of the work vehicle 12. However, in alternative embodiments, the user interface 48 an element of the central control station. In some embodiments, the central control station is situated near the agricultural field, the agricultural implement 10, and/or the work vehicle 12. However, the central control station may be placed in any suitable location sufficient to enable the user interface 48 to interact and/or communicate with the controller 42. Furthermore, as described above, the operator may interact with the user interface 48 via a touch-screen, mechanical keys, a keyboard, a mouse, or the like.

In the illustrated embodiment, the user interface 48 includes a menu panel 58. The menu panel 58 is configured to display information to the operator for evaluating the progress and adjusting the settings of the work vehicle 12.

As shown, the menu panel 58 includes a mission panel 60 configured to store saved missions and enable the operator to select desired missions. As used herein, mission refers to the task or overall goal assigned to the one or more work vehicles 12 and/or the agricultural implement 10. For instance, the mission may refer to plowing the agricultural field or fertilizing a section of the agricultural field. However, elements of the mission (e.g., path of travel, steps taken to complete the mission, etc.) may be referred to as parameters, steps, or the like. In some embodiments, the parameters of the mission are determined by the controller 42. For example, the controller 42 may determine the path of travel of the work vehicle 12 based on the mission. However, in other embodiments, the operator may input the parameters of the mission. For instance, the operator may import the path of travel of the work vehicle 12 to correspond with known field conditions, such as grade. Accordingly, the mission for a work vehicle 12 is unlikely to change because of an unexpected occurrence (e.g., mechanical breakdown, low fertilizer levels, etc.). As shown, three mission icons 62, 64, 66 are available for selection by the operator. However, in alternative embodiments, there may be 4, 5, 6, or any suitable number of mission icons. Moreover, in other embodiments, the mission icons may be presented as a drop-down menu, a scrolling menu, or the like.

In the illustrated embodiment, the first mission icon 62 corresponds to a tillage operation, in which the work vehicle 12 is instructed to follow a circuitous path through a first agricultural field with tillage equipment (e.g., field cultivators, harrows, rippers, etc.) coupled to the work vehicle 12. Accordingly, the mission corresponds to tilling the agricultural field bounded by dimensions established by the operator. As will be described in detail below, the controller 42 may evaluate the mission selected by the operator and configure the parameters of the mission (e.g., via an optimization process) to decrease the time of completion of the mission, to reduce losses, and/or to increase yields (e.g., based on imported yield maps or previous soil analysis).

As shown, the second mission icon 64 corresponds to a fertilizing operation configured to follow a similar circuitous path as the tillage operation in the first agricultural field. However, each mission icon 62, 64, 66 does not necessarily correspond to a mission in the same field. For instance, in the illustrated embodiment, the third mission icon 66 corresponds to a tillage operation in a second agricultural field. As such, the operator may input several different missions for different fields into corresponding mission icons prior to or concurrently with execution of a mission. Accordingly, successive missions may be executed without planning delays. For example, in certain embodiments, missions are imported to the control system and displayed on the mission panel 60 while the work vehicle 12 is completing another mission. For example, while the work vehicle 12 is conducting the first mission, the operator may develop a third mission for future use, and subsequently upload the third mission to the control system 40 for display on the user interface 48. In certain embodiments, the missions may be planned based on user inputs. For example, the operator may input field dimensions, implement dimensions, and the like and the automatic control system of the control system 40 may plan the parameters used to complete the mission. Moreover, as will be appreciated, while three mission icons 62, 64, 66 are shown in the mission panel 60, any suitable number of mission icons may be displayed in the mission panel 60 (e.g., corresponding to missions stored in the control system 40).

In the illustrated embodiment, the menu panel 58 includes an information panel 68. The information panel 68 displays information to the operator regarding several functions of the work vehicle 12 and/or the agricultural implement 10. For instance, a work vehicle icon 70 may display information regarding the operation of the work vehicle 12 (e.g., speed, engine RPM, fuel level, etc.). Moreover, a control icon 72 is configured to enable the operator to make adjustments to the work vehicle 12 and/or the agricultural implement 10. For instance, the operator may adjust the speed of the work vehicle 12 or modify the fertilizer flow rate of the agricultural implement 10 using the control icon 72. As will be appreciated, several adjustments may be made via the control icon 72 (e.g., adjust hitch position, vary seeding rate, etc.). In the illustrated embodiment, the information panel 68 includes additional information icons 74, 76, 78, 80. Each icon is configured to supply additional information to the operator monitoring the mission. For instance, the icon 74 may relay the direction of the work vehicle 12, while the icon 76 relates the estimated time for completion. In the illustrated embodiment, the information panel 68 is customizable to enable the operator to change the displayed information in the icons 74, 76, 78, 80. For example, a settings icon 82 enables the operator to adjust the information displayed on the information panel 68. Furthermore, a power icon 84 is configured to cycle the user interface 48 between an on/off/standby state.

As shown in FIG. 3, the user interface 48 includes a map panel 86. The map panel 86 is configured to display a visual indication of the mission in a field panel 88, along with a complete section 90 and a yet-to-complete section 92. In the illustrated embodiment, the complete section 90 is differentiated from the yet-to-complete section 92 through shading and/or hatch-marks. However, in other embodiments, the complete section 90 may be a different color than the yet-to-complete section 92. Accordingly, the operator may quickly and efficiently see a pictoral display of the remaining work for the selected mission. It should be appreciated that the complete section 90 is indicative of a position of the work vehicle 12 along the path of travel. Moreover, the yet-to-complete section 92 is indicative of the portion of the field remaining to complete the mission.

In the illustrated embodiment, the map panel 86 includes a graphical representation 94 of the work vehicle 12 to illustrate a current position of the work vehicle 12 in the agricultural field. Moreover, the map panel 86 includes a first path (e.g., desired path) 96 illustrating the desired path of the work vehicle 12 to facilitate completion of the mission. In the illustrated embodiment, the first path 96 is a circuitous route through the agricultural field with an end point 98. While the end point 98 is shown at a bottom corner of the agricultural field in the illustrated embodiment, it should be appreciated that the end point 98 may be placed at any location that the operator and/or controller 42 selects for efficient field operations.

The map panel 86 also includes an information icon 100 along with modification icons 102, 104. For example, the information icon 100 is configured to display details about the progression of the mission (e.g., current direction of travel, time remaining, etc.) while the modification icons 102, 104 are configured to enable the operator to review and/or change the information displayed in the information icon 100. As mentioned above, the settings icon 82 may be used to modify the information displayed on the information icon 100. It should be appreciated that while a single information icon 100 is shown, in other embodiments 2, 3, 4, 5, 6, or any other suitable number of information icons 100 may be present.

As mentioned above, in some embodiments the mission of the work vehicle 12 is disturbed for a variety of reasons (e.g., weather, fuel level, product level, etc.). An instruction icon 106 is included in the map panel 86. The instruction icon 106 is configured to enable the operator to adjust the operation of the work vehicle 12. For example, the instruction icon 106 may initiate "STOP" or "PAUSE" to provide the operation with the option of stopping or pausing the current mission and/or the work vehicle 12. As will be described in detail below, the instruction icon 106 may change to "RESUME" or "REPLAN" after the mission is stopped and/or paused to provide the option of restarting the mission from the stopping point, or replanning the mission to enhance productivity.

In the illustrated embodiment, the map panel 86 includes a toggle icon 108 configured to enable changes in the path of travel of the work vehicle 12. For example, the toggle icon 108 may include several options for paths of travel, which may be selected by the operator. Furthermore, the operator may upload additional or alternative paths of travel to account for terrain changes in the agricultural field. For instance, the operator may upload a path of travel that leaves sections of the field unworked for field management purposes. As mentioned above, it should be appreciated that additional icons may be included in the map panel 86 to enhance and/or to provide additional functionality to the system.

Figure 4:
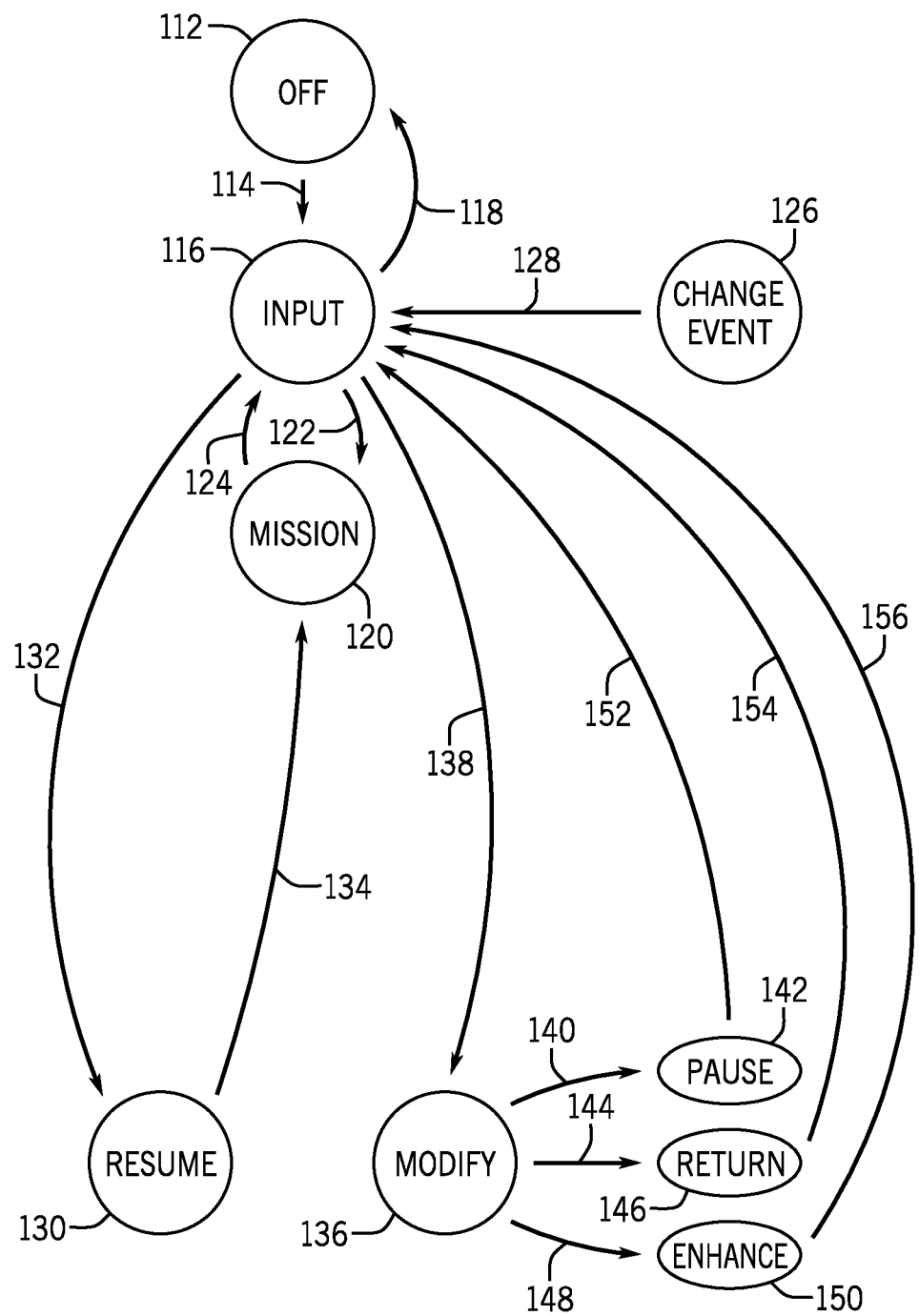
FIG. 4 is a state diagram of an embodiment of a technique for controlling a work vehicle.

FIG. 4 is a state diagram of an embodiment of a technique 110 for controlling the autonomous work vehicle 12. Prior to initiating the working process, the control system 40 is in an off state 112. As indicated by the arrow 114, activating the control system 40 transitions the control system 40 from the off state 112 to an input state 116. Conversely, deactivating the control system, as indicated by the arrow 118, transitions the control system 40 to the off state 112. Upon selection of a mission from the mission panel 60, the control system 40 transitions to a mission state 120, as indicated by the arrow 122. While in the mission state 120, the work vehicle 12 travels along the determined path 96 to complete the mission, as described above. Upon completion of the mission, the control system 140 transitions back to the input state 116, as indicated by the arrow 124.

However, a change event 126 may occur during the mission. For example, an alert may appear on the user interface 48 to indicate an event (e.g., low fuel, low fertilizer level, mechanical failure, newly available resources, etc.) that may affect the completion of the mission. The alert may be transmitted to the user interface 48 and prompt the operator to provide an input regarding the completion of the mission. As indicated by the arrow 128, the operator input is response to the change event 126 transitions the control system 40 back to the input state 116. While in the input state 116, the operator and/or the automatic control system may select the resume state 130, as indicated by the arrow 132. The resume state 130, as indicated by the arrow 134, transitions the control system 40 to the mission state 120. That is, the resume state 130 instructs the control system 40 to resume the mission as described below.

In the illustrated embodiment, the operator and/or the automatic control system may transition the control system 40 to the modification state 136, as indicated by the arrow 138. As described above, the automatic control system may be included in the control system 40. In the modification state 136, the operator and/or the automatic control system determines the subsequent course of action. For example, as indicated by the arrow 140, the control system 40 may transition to a pause state 142. In the pause state, the work vehicle 12 is paused or stopped. As a result, the mission is suspended until the operator and/or the automatic control system provides subsequent inputs. In another embodiment, as indicated by the arrow 144, the control system 40 may transition to a return state 146. In the return state 146, the operator and/or the automatic control system provides instructions to the control system 40 to guide the work vehicle 12 to a designated area for maintenance, refueling, or the like. For example, upon receiving a signal that the work vehicle 12 is low on fuel, the operator may select the modification state 136, and subsequently the return state 146, to guide the work vehicle 12 to an area where the work vehicle 12 may be refueled to facilitate completion of the mission (e.g., via subsequent selection of the resume state 130). Furthermore, as indicated by the arrow 148, the operator and/or the automatic control system may select an enhancement (e.g., optimization) state 150. In the enhancement state 150, the controller 42 is configured to change and/or recalculate the path of travel for the work vehicle 12. As will be described in detail below, by selecting the enhancement state 150, the controller 42 evaluates the portion of the mission remaining and determines if a new path may improve completion of the mission (e.g., shorter duration, more efficient use of resources, etc.).

As described above, the modification state 136 enables the operator and/or the automatic control system to adjust parameters of the mission. In the illustrated embodiment, upon completion of the pause state 142, as indicated by the arrow 152, the system transitions back to the input state 116. Moreover, in some embodiments, upon completion of the return state 146, as indicated by the arrow 154, the system transitions back to the input state 116. Furthermore, upon completion of the enhancement state 150, the system transitions back to the input state 116, as indicated by the arrow 156. Once the system returns to the input state 116, the operator and/or the automatic control system may select the resume state 130 to reinitiate the mission state 120 via the arrow 134. As described above, in the event that the mission is changed through selection of the enhancement state 150, the mission state 120 is updated to reflect the changes via the arrow 122.

Figure 5:
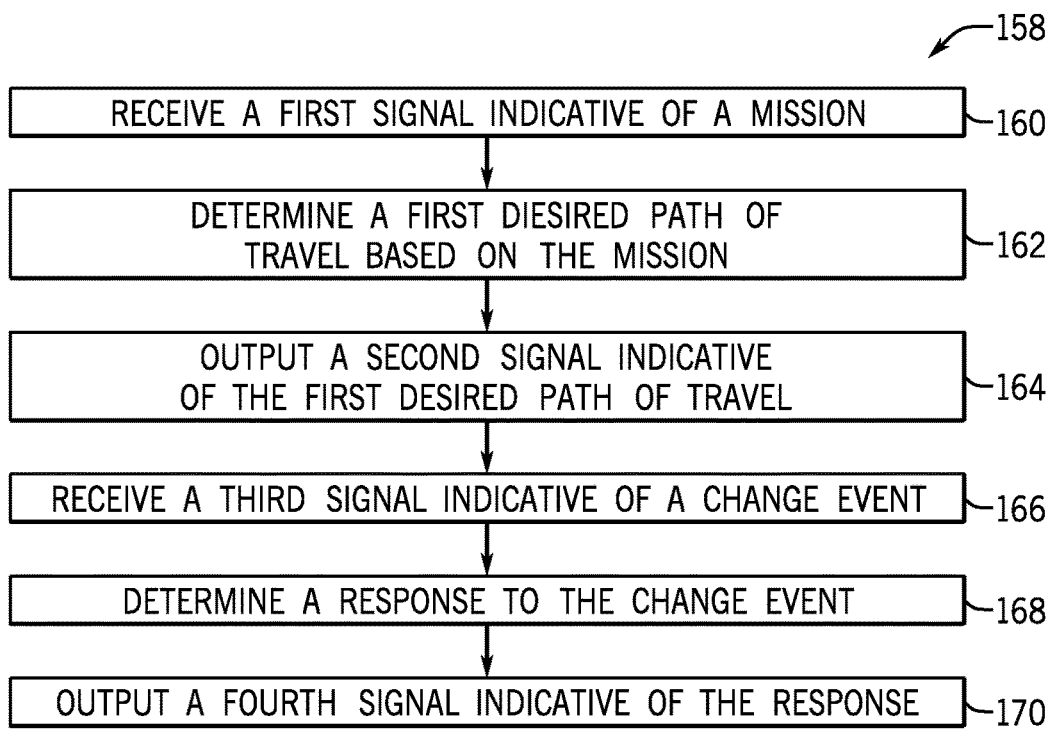
FIG. 5 is a flow chart of an embodiment of a method for operating an automated control system.

FIG. 5 is a flow chart of an embodiment of a method 158 for operating the autonomous work vehicle 12. The controller 42 receives a first signal indicative of a mission at block 160. For example, the controller 42 may receive an input from the operator via interaction with the user interface 48. However, in other embodiments, the automatic control system may send the signal to the controller 42 (e.g., based on instructions stored on the memory 44). At block 162, the controller 42 determines a first desired path of travel based on the mission. For instance, the controller 42 may evaluate the parameters of the mission to determine an efficient path of travel through the agricultural field to facilitate completion of the mission. The controller 42 outputs a second signal indicative of the first desired path of travel at block 164. In certain embodiments, the work vehicle 12 is configured to adjust a target path of travel based on the first desired path of travel. For example, the controller 42 may generate a path of travel that improves the efficiency of operation of the mission. In the illustrated embodiment, at block 166, the controller 42 receives a third signal indicative of a change event from the work vehicle 12 or from the operator. For instance, the controller 42 may receive an alert from the work vehicle control system 52 indicating that the work vehicle 12 is low on fuel. Alternatively, the operator may send the change event to the controller 42 from the central control station indicating that inclement weather is approaching. At block 168, the controller 42 determines a response to the change that. That is, the controller 42 determines a response that facilitates completion of the mission. For example, the controller 42 may pause the mission to enable the operator to maneuver the work vehicle 12 to a refueling location. At block 170, the controller 42 outputs a fourth signal indicative of the response. In certain embodiments, the work vehicle 12 receives the response from the controller 42 and adjusts the target path of travel. For example, the controller 42 may adjust the path of travel after the refueling event to enhance the efficiency of the agricultural operation.

As described above, the method 158 enables the operator and/or the automatic control system to monitor the mission throughout different stages of progression. Moreover, the operator and/or the automatic control system may modify the mission in accordance with changing circumstances. For example, inclement weather may lead an operator to pause the mission and resume it on a subsequent day. Moreover, because the controller 42 is configured to store the position of the work vehicle 12 in the memory 44, subsequent operations may be resumed at substantially the same point at which the operations were suspended. As a result, the possibility of leaving undeveloped field sections (e.g., unfertilized sections, uncut sections, etc.) after a change or restart is substantially reduced. Furthermore, the method 158 enables the operator and/or the automatic control system to efficiently manage ongoing missions as new resources become available. For example, as described above, the operator and/or the automatic control system may modify the mission upon receiving a signal indicating that a second work vehicle 12 is available. As a result, the duration to complete the mission may be reduced.

Figure 6:
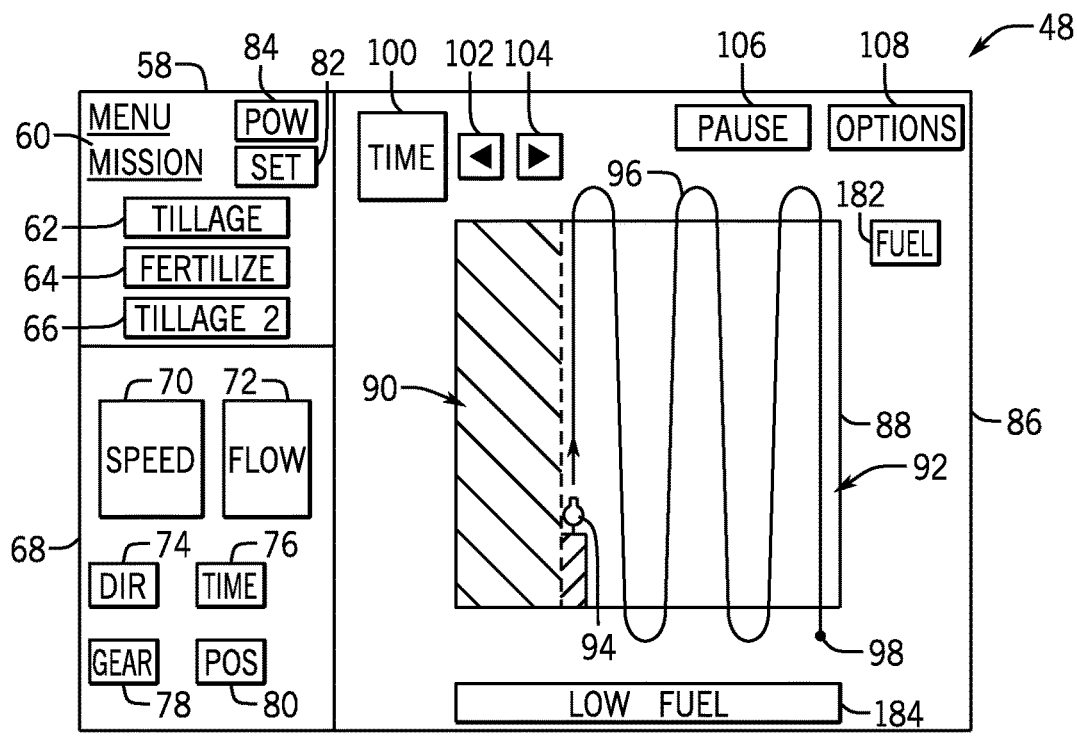
FIG. 6 is a schematic drawing of the user interface of FIG. 3, in which a return state is active.

FIG. 6 is a schematic diagram of an embodiment of the user interface 48 after a change event is received. As described in detail above, the user interface 48 includes a field panel 88, illustrating a graphical representation of the agricultural field, the work vehicle 12, and the first path 96. In the illustrated embodiment, a change event notification may appear on the information icon 100. As a result, as described above, the operator and/or the automatic control system may modify mission parameters. For example, the change event notification may indicate that the work vehicle 12 is low on fuel. The operator (e.g., via interaction with the user interface 48) and/or the automatic control system may instruct the work vehicle 12 to travel to a location 182 for refueling. For instance, the operator may interact with the instruction icon 106 to select the return state 146. As described above, in certain embodiments, the controller 42 is configured to store the current position of the work vehicle 12 (e.g., the complete section 90 and the yet-to-complete section 92) and to direct the work vehicle 12 to travel to the location 182. Alternatively, the operator may manually guide the vehicle 12 to location 182. Furthermore, the operator may manually guide the vehicle 12 back to the agricultural field and activate the resume state 130 to facilitate completion of the mission. The user interface 48 also includes a notification icon 184 configured to provide an indication to the operator that a refueling process is taking place.

Figure 7:
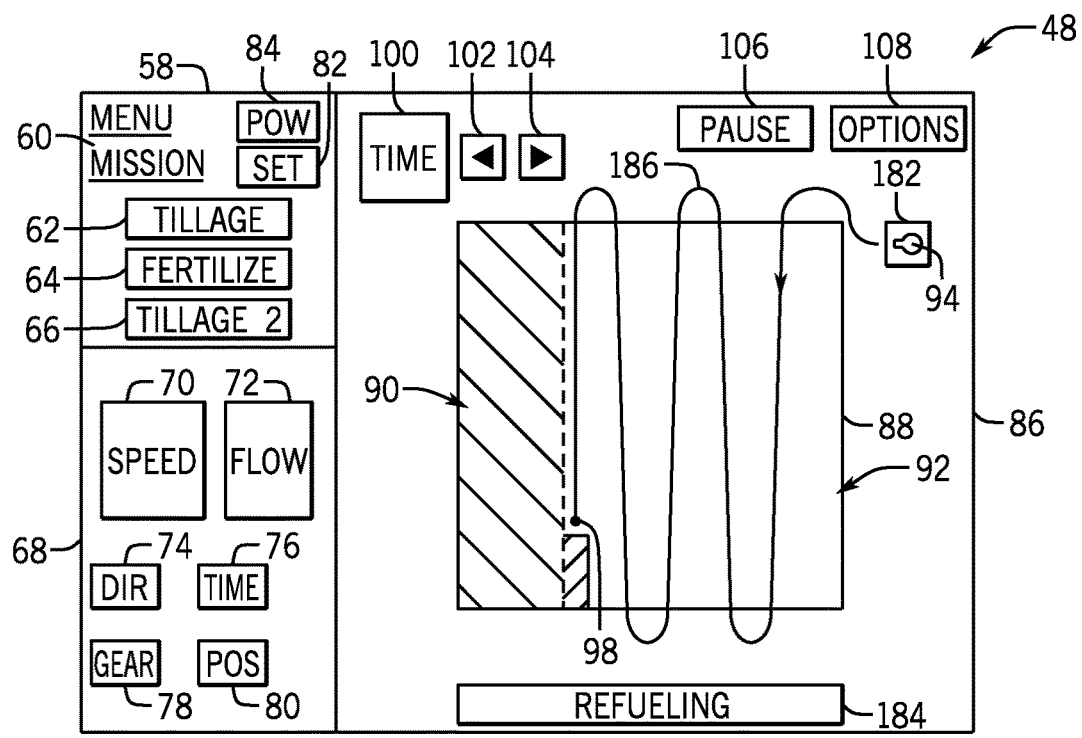
FIG. 7 is a schematic drawing of the user interface of FIG. 3, in which an enhancement state is active.

FIG. 7 is a schematic diagram of an embodiment of the user interface 48 after the path of travel is replanned via the enhancement state 150. As illustrated, the work vehicle 12 is positioned at the location 182 undergoing a refueling operation. The operator may select the enhancement state 150 after the refueling process is complete. As a result, a second path 186 is planned and displayed on the field panel 88, thus repositioning the end point 98. For example, the controller 42 may compare the location 182 to the previous stored position of the work vehicle 12 (e.g., the position of the vehicle 12 at termination of agricultural operations). The controller 42 may then determine a second path that covers the unworked portions of the field. For example, the controller 42 may determine that restarting the mission from the top right corner of the field is more efficient than returning to the previous position of the work vehicle 12. It should be appreciated that the overall mission objection (e.g., plowing the field) is unchanged, even though the second path 186 is used to complete the mission. Using the second path, the work vehicle 12 may use less fuel by restarting at a point on the agricultural field closer to the location 182, as compared to returning to the position where the mission was paused.

Figure 8:
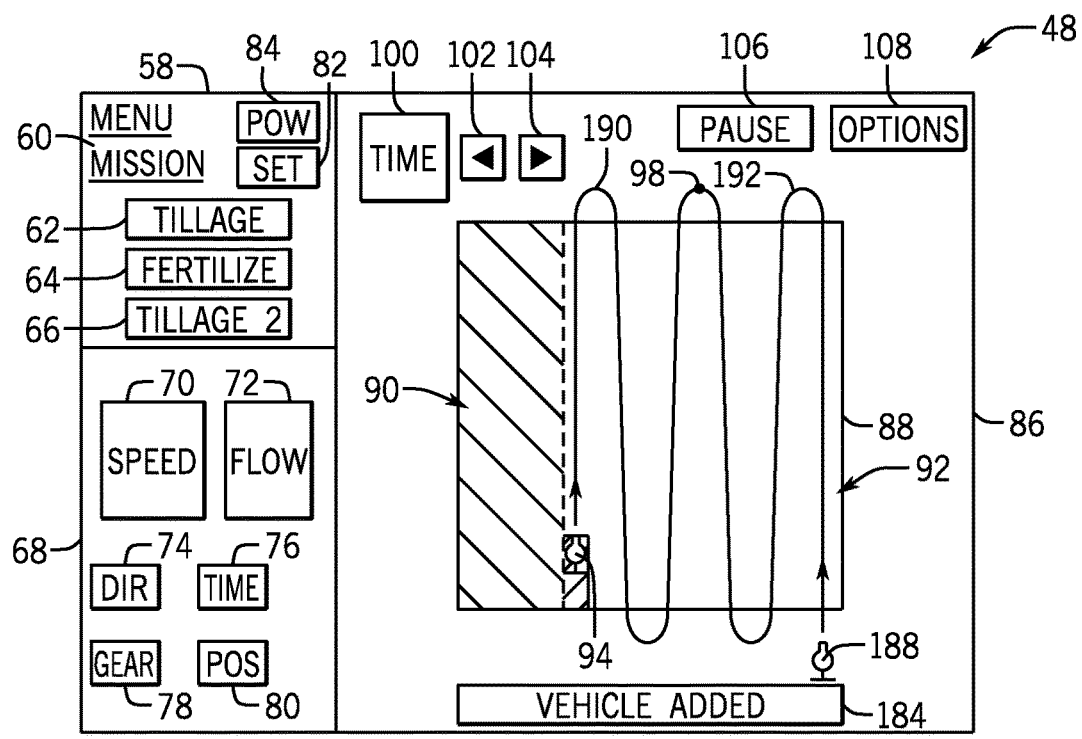
FIG. 8 is a schematic drawing of the user interface of FIG. 3, in which an enhancement state for controlling two work vehicles is active.

FIG. 8 is a schematic diagram of an embodiment of the user interface 48 after the parameters of the mission are enhanced in response to the availability of additional resources. As described above, the work vehicle 12 may receive a signal indicative of a change event. In some embodiments, the signal is delivered directly to the work vehicle 12 via the onboard communication module 56. However, in other embodiments, the central control station may relay the signal. For example, the information icon 100 on the user interface 48 may indicate that additional resources are available to complete the mission. For instance, a second work vehicle 188 may be available. In the illustrated embodiment, the operator and/or the automatic control system may elect the enhancement state 150 to incorporate the second work vehicle 188 into the yet-to-complete portion 92 of the mission. As a result, the controller 42 is configured to generate a third path 190 for the first work vehicle 12 and a fourth path 192 for the second work vehicle 188. As shown, the end point 98 is shifted such that the third path 190 is shorter than the first path 96. Accordingly, the controller 42 may direct the first work vehicle 12 and the second work vehicle 188 to continue the mission. As a result, the duration of the mission is reduced due to the enhancement of the third path 190 and the fourth path 192 relative to the yet-to-complete section 92. That is, by storing the complete section 90 the controller 42 is configured to recalculate the third path 190 and the fourth path 192 to only include the yet-to-complete section 92. Moreover, while the additional of work vehicles 12 was discussed as adding a one vehicle 12 to a field where one vehicle 12 was operating, any suitable combination may be included. For example, one vehicle may be incorporated into a mission utilizing two vehicles, two vehicles may be incorporated into a mission utilizing two vehicles, three vehicles may be incorporated into a mission utilizing one vehicle, and the like.

In other embodiments, the change event may indicate that the second work vehicle 188 is unable to complete the mission (e.g., due to mechanical failure, due to commitments elsewhere, etc.). Accordingly, the controller 42 may calculate a new path of travel for the first work vehicle 12 to incorporate the portion of the field that the second work vehicle 188 had initially been instructed to complete. That is, the controller 42 may generate a new path of travel to complete the mission based on the complete sections 90 from each of the first work vehicle 12 and the second work vehicle 188. As a result, the mission may quickly and efficiently be replanned utilizing fewer resources than originally designated.

As described in detail above, the disclosed embodiments include a user interface 48 for adjusting and monitoring the controller 42. For instance, the user interface 48 is configured to enable the operator to monitor the progression of the work vehicle 12 through the mission. Moreover, the user interface 48 may provide an indication to the operator when the change event has occurred and enable modifications to the mission parameters if desired. For example, the user interface 48 may provide an indication that the work vehicle 12 is low on fuel. As a result, the operator may interact with the user interface 48 to send a signal to the controller 42 to instruct the work vehicle 12 to travel to the location 182 for refueling. In certain embodiments, the operator may manually direct the work vehicle 12 to the location 182 for refueling. Additionally, the operator and/or the automatic control system may resume the mission after refueling is complete. Moreover, the user interface 48 may enable the operator to direct the controller 42 to enhance the path of travel of the work vehicle 12 to increase the efficiency of the mission. Furthermore, the operator may interact with the user interface 48 to engage additional resources, in available, to further improve the efficiency of the mission. As a result, the operator may quickly modify the parameters for completing the mission without changing the overall goal of the mission. Moreover, the operator may continuously monitor the progression of the work vehicle 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electronic control system for an agricultural system, comprising:

a controller comprising a memory operatively coupled to a processor configured to store data and instructions that, when executed by the processor, cause the controller to perform a method comprising:

receiving a first signal indicative of a mission of a controllable device of the agricultural system;

determining a first desired path of travel of the controllable device based on the mission;

outputting a second signal to the controllable device indicative of the first desired path of travel, wherein the controllable device is configured to adjust a target path of travel based on the first desired path of travel;

receiving a third signal indicative of a change event, wherein the change event comprises a low fuel level, a low product level, inclement weather, a mechanical issue, or the availability of a second controllable device, and wherein the memory is configured to store a value indicative of a first position of the controllable device along the target path of travel upon receiving the third signal;

determining a response to the change event that facilitates completion of the mission, wherein the response to the change event comprises:

determining a second desired path of travel that extends from the first position to a second position for refueling if the change event is the low fuel level, for adding product if the change event is the low product level, for storage if the change event is the inclement weather, or for maintenance if the change event is the mechanical issue; and determining a third desired path of travel that extends from the second position to the first position and facilitates completion of the mission as the controllable device traverses the third desired path of travel; and outputting a fourth signal indicative of the response to the controllable device, wherein the controllable device is configured to adjust the target path of travel based on the second desired path of travel and the third desired path of travel.

2. The electronic control system of claim 1, wherein determining the response to the change event is based on input from an automatic control system, from a user interface, or a combination thereof.

3. The electronic control system of claim 1, wherein the response to the change event comprises pausing and then resuming the mission.

* * * * *